United States Patent [19]
Schmitt

[11] Patent Number: 5,547,120
[45] Date of Patent: Aug. 20, 1996

[54] METHOD OF MAKING A GASTIGHT CONNECTION BETWEEN A CONDUCTOR AND AN INSULATION IN FORM OF A TUBE

[75] Inventor: Theodore Schmitt, Vienna, Austria

[73] Assignee: Electrovac, Fabrikation elektrotechnischer Spezialartikel Gesellschaft m.b.H., Klosterneuburg, Austria

[21] Appl. No.: 415,076

[22] Filed: Mar. 30, 1995

[30] Foreign Application Priority Data

Mar. 30, 1994 [AT] Austria ........................... 681/94

[51] Int. Cl.⁶ ................. H01R 4/00; H01J 9/32
[52] U.S. Cl. ........................... 228/121; 228/131
[58] Field of Search ........................... 228/121, 131

[56] References Cited

U.S. PATENT DOCUMENTS 3,819,420 6/1974 Schmitt et al. ................. 136/228
5,223,123 6/1993 Koch ........................... 65/59.1 X Primary Examiner—Kenneth J. Ramsey
Attorney, Agent, or Firm—Henry M. Feiereisen

[57] ABSTRACT

A method of making a gastight connection between a conductor and an insulation in form of a tube made of a temperature-resistant material, includes the steps of inserting a conductor-forming wire of metal in the tube and heating the wire within the tube to a temperature above its melting point, whereby the tube essentially maintains its configuration.

9 Claims, 1 Drawing Sheet

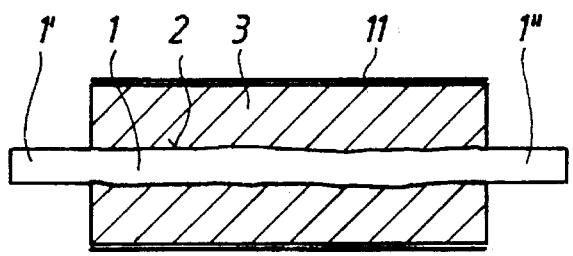
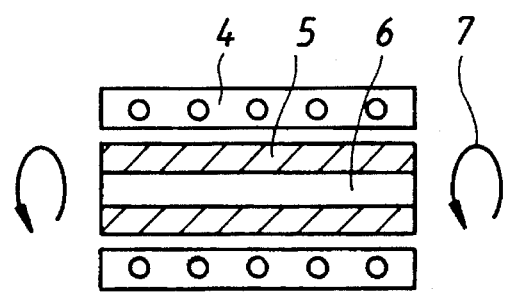
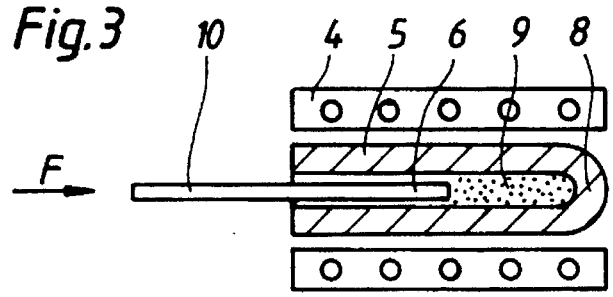
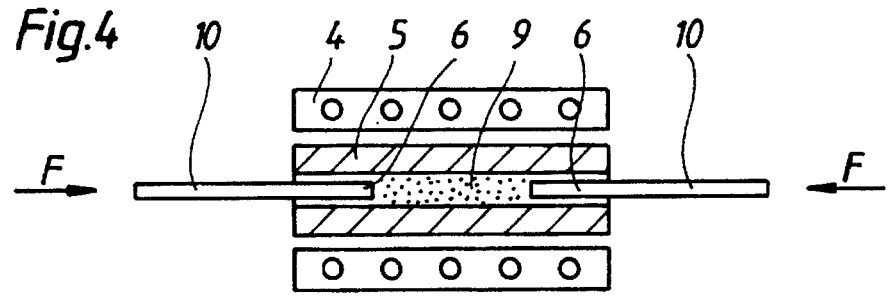

METHOD OF MAKING A GASTIGHT CONNECTION BETWEEN A CONDUCTOR AND AN INSULATION IN FORM OF A TUBE

BACKGROUND OF THE INVENTION

The present invention refers to a method of making a gastight connection between a conductor and an insulation in form of a tube of a type made of a temperature-resistant material, e.g. ceramics, glass or the like.

The use of ceramics or glass as a high-grade insulating material for metallic electrical conductors is well known. In general, the conductor is received in a ceramic tube or in a plurality of adjoining short ceramic tubes or glass pellets for maintaining the flexibility of the conductor. To date, the gastight connection between conductor and insulation is effected by sealing e.g. the exit area of the conductor from the insulation in a gastight manner. A drawback of this proposal is the limitation of the gastight connection between the insulation and the conductor to a relatively small region of the sealing, thus increasing the risk of creating leaky areas during production or during use, e.g. through impacting mechanical forces.

SUMMARY OF THE INVENTION

It is an object of the present invention to provide an improved method for making a gastight connection between a conductor and an insulation, obviating the afore-stated drawbacks.

This object and others which will become apparent hereinafter are attained in accordance with the present invention by inserting a conductor-forming metal wire in the tube and heating the wire within the tube to a temperature above its melting point, whereby the tube essentially maintains its configuration.

In this manner, a melting of the conductor metal within the tube is ensured to thereby attain an intimate bonding with the inside surface of the tube, with irregularities of the inside wall of the tube being engaged by the conductor metal to create a tight connection of the conductor metal with the surrounding tube.

Practice has shown that this simple and cost-efficient method establishes a continuos vacuum-tight or gastight connection of metal and insulator. Even when the melting metal fails in some areas to bear upon the surrounding insulator material, the electric conductivity as well as the gastight connection still remain complete over the entire length of the conductor.

During melting of the conductor metal within the tube, it is advantageous to select a targeted heating method by which essentially only the conductor is directly heated but not the surrounding tube. An example for such a targeted heating of the conductor is a resistance heating by which a respectively high current flows through and thereby heats the conductor, whereby projecting conductor areas are cooled if necessary. It is also possible to heat the conductor through magnetic alternating fields, leading to a formation of eddy currents in the conductor for heating same. A heating of the conductor in this fashion is advantageous because the impact zone of the magnetic alternating fields can be focused on the desired area to be melted.

By restricting the heating action essentially to the conductor, e.g. through electric resistance heating or eddy current heating, it is also possible to tightly bond conductors which have a melting point that exceeds the softening or melting temperature of the surrounding tube of e.g. glass, with the tube, whereby the tube essentially retains its configuration. If desired, the tube may also be cooled.

When using tubes of a material, e.g. ceramics that has a melting temperature or softening temperature greatly exceeding the melting temperature of the conductor material, the heating action may also be generated through radiation heat or introduction of a respectively hot medium, e.g. suitably heated air or heated inert gas. In this case, the tube is directly heated while the conductor metal is heated through radiating heat which penetrates the tube walls.

An advantage of the method according to the present invention is the capability to carry out the melting process at normal gas atmosphere. In some instances, it may however be desirable to carry out the melting process in a vacuum plant, possibly under pressure, to melt the conductor metal within the tube. The simultaneous application of pressure results in a particular intimate bonding of the conductor with the surrounding inside wall of the tube because pressure application forces the melting conductor metal to penetrate especially small irregularities on the inside wall of the tube so that substantially the entire inside wall of the tube is lined with melted conductor metal. This effect of completely lining the inside wall of the tube with conductor metal can also be accomplished by rotating the insulating ceramic tube and the conductor metal about the tube axis during melting and after melting.

In accordance with another feature of the present invention, a metal wire is inserted in the insulating tube at a length that exceeds the length of the tube so that melting excess length of the metal wire can be pushed into the tube during the heating action. This enables a simple solution to apply pressure upon the conductor metal melting within the interior of the tube, and a possible difference between the volume of the tube interior and the wire volume, which may exist to allow the wire to be pushed into the tube, is compensated. In practice, the excess length can be pushed into the hot interior of the ceramic tube by means of a mechanical device until the tube is completely filled with metal. Alternatively, the ceramic tubes may also be placed in a vertical position during the melting process so that gravity forces will urge the excess length or projecting portion of the metal into the tube interior.

By selecting the diameter of the ceramic tube and utilized wire in a dimensional range which is common for electric conductor passages in small structure, the capillary effect within the ceramic tube prevents liquefied metal from escaping the tube during the melting process.

With the method according to the present invention, a conductor insulated by a ceramic tube is produced which maintains its properties over its entire length so that a section of insulated conductor can be simply cut off from a length of prefabricated conductor for subsequent processing, without necessitating a separate seal between insulation and conductor. An examination of a random cross sectional area of such an conductor under the microscope or through a micrograph shows the intimate bond of metal and ceramics so that the conductor according to the invention is clearly superior to conventional conductors insulated by ceramic material and sealed at only one single cross sectional area.

BRIEF DESCRIPTION OF THE DRAWING

The above and other objects, features and advantages of the present invention will now be described in more detail with reference to the accompanying drawing in which:

FIG. 1 is a partly longitudinal section of an insulated conductor or conductor section according to the present invention; and FIGS. 2–4 show schematic, partly sectional views of various arrangements for making a gastight connection between a conductor and an insulation.

DETAILED DESCRIPTION OF PREFERRED EMBODIMENTS

Turning now to the drawing, and in particular to FIG. 1, there is shown a metallic conductor 1, which preferably is made of copper and completely fills the interior space 2 of a tube 3 made of ceramic material, with the melting or softening temperature of the ceramic tube 3 exceeding the melting point of the conductor 4. During melting, the metal of the conductor 1 completely lines the surrounding inside surface of the ceramic tube 3 to compensate any unevenness or irregularities and to attain a gastight and vacuum-tight bonding throughout between the metal of the conductor 1 and the ceramic material of the tube 3. FIG. 1 further shows the conductor 1 of a length exceeding the length of the tube 3 to thereby form excess lengths or projecting parts 1', 1" of the conductor 1 for a purpose to be described further below.

Lined on the outside of the ceramic tube 3 is a thin metal coating 4 for allowing a soldering in metallic components.

Persons skilled in the art will understand that FIG. 1 shows the conductor 1 and the tube 3 on an enlarged scale in order to allow illustration of irregularities of the inside surface of the ceramic tube 3 and the thickness of the external metal coating 4.

Turning now to FIG. 2, there is shown a schematic illustration of an arrangement of making a gastight connection between a conductor 6 and a ceramic tube 5. The ceramic tube 5 is placed in a melting furnace 4, with the conductor 6 being pushed in the tube 5 to preferably completely fill the latter. Upon raising the temperature of the metallic conductor 6 to and above its melting point, the metal melts and bonds to the inside surface of the ceramic tube 5. A selection of the diameter of the ceramic tube 5 and the utilized wire 6 in a dimensional range which is common for electric conductor passages in small components results in a capillary action within the ceramic tube 5 so that liquefied metal is prevented from escaping the tube 5 during the melting process.

In FIG. 2, the ends of the conductor 6 terminate flush with the end faces of the tube 5. A variation of this configuration is shown in FIG. 3 in which the metal wire has a length which exceeds the length of the ceramic tube 5, with the excess length or projecting pan 10 being used for filling up the tube 5 during melting. In this manner, a possible difference between the volume of the tube interior and the wire volume, which may exist in order to allow the wire to be pushed into the tube, is compensated.

In practice, the excess length 10 can be pushed into the hot interior of the ceramic tube 5 by means of a mechanical device until the interior is completely filled with metal. Alternatively, the ceramic tube 5 may be placed in vertical position during melting to enable the excess metal wire length 10 to sink into the tube interior by way of gravitational forces.

The bond between melting metal and the inside surface of the tube 5 can also be accomplished by rotating the tube 5 about its axis in a direction as indicated by arrows 7 during melting and after melting of the conductor metal. When using an excess length 10 of the metal wire in relationship to the length of the ceramic tube 5, as shown in FIG. 3, one end 8 of the tube 5 is suitably closed so that melted metal 9 can be pressurized through advancing or pushed-in excess length 10 of the conductor 6.

Alternatively, the fusion of metal onto the inside surface of the tube 5 can also be carded out under pressure in such a manner that in the arrangement according to FIG. 2, pressure is applied from both end faces of the ceramic tube 5, e.g. in a pressure vessel, or according to FIG. 3 which shows a conductor piece 6 of approximately same length as the ceramic tube 5, pressure is applied in a pressure vessel onto the melting metal by pushing in projecting part 10 onto the tube 5.

FIG. 4 shows an arrangement in which both ends of the tube 5 are open, with a conductor 6 being respectively inserted from each end into the tube 5 to exert pressure onto the melting metal 9 within the interior of the tube 5 by pushing the projecting part 10 that extends beyond the respective end face of the tube 5, into tube 5 in direction of arrow F during progressing melting action.

The arrangements according to FIGS. 2, 3 or 4 can be suited to the requirements of the melting process and operate under normal atmosphere, inert gas atmosphere or vacuum, with or without pressure application.

It will be appreciated by persons skilled in the arts that the tube may be made of a material other than ceramic. Suitable materials for the tube include any high temperature resistant electrically insulated material, such as e.g. glass with a melting point higher than the melting point of the metal being melted. Assuming that essentially only the conductor is to be heated, the conductor can be fused in a tube made of a material with a softening temperature or melting temperature below the melting temperature of the conductor when the tube has sufficient wall thickness to rapidly absorb the heat from the interface between the conductor and the inside wall of the tube and to avoid a melting of larger areas of the tube. A melting of the tube at the interface of its inside wall promotes an intimate and thus gastight bonding between the conductor and the surrounding tube.

While the invention has been illustrated and described as embodied in a method of making a gastight connection between a conductor and a insulation in form of a tube, it is not intended to be limited to the details shown since various modifications and structural changes may be made without departing in any way from the spirit of the present invention.

What is claimed as new and desired to be protected by Letters Patent is set forth in the appended claims:

I claim:

1. A method of making a gastight connection between a conductor and an insulation in form of a tube made of a temperature-resistant material, comprising the steps of inserting a conductor-forming wire of metal in the tube, and heating the wire within the tube to a temperature above its melting point, whereby the tube essentially maintains its configuration.

2. The method of claim 1 wherein said heating step includes melting the metal wire in the insulation within a vacuum plant.

3. The method of claim 2 wherein said melting step includes pressurizing the metal wire.

4. The method of claim 1 wherein said heating step includes melting the metal wire under an atmosphere of inert gas.

5. The method of claim 4 wherein said melting step includes pressurizing the metal wire.

6. The method of claim 1, further comprising the step of pressurizing the wire after said heating step.

7. The method of claim 1 wherein said inserting step includes placing a metal wire of a length exceeding the length of the tube into the tube, and further comprising the step of pushing melting excess length of metal wire into the tube during said heating step.

8. The method of claim 1, further comprising rotating the metal wire and the tube about its axis during said heating step and after said heating step.

9. The method of claim 1 wherein said inserting step includes placing the metal wire in a tube of a temperature-resistant material selected from the group consisting of ceramics and glass.

* * * * *